Jan. 23, 1940.  A. E. SIMONSON  2,188,235
PLANTER
Filed May 5, 1938  2 Sheets-Sheet 1
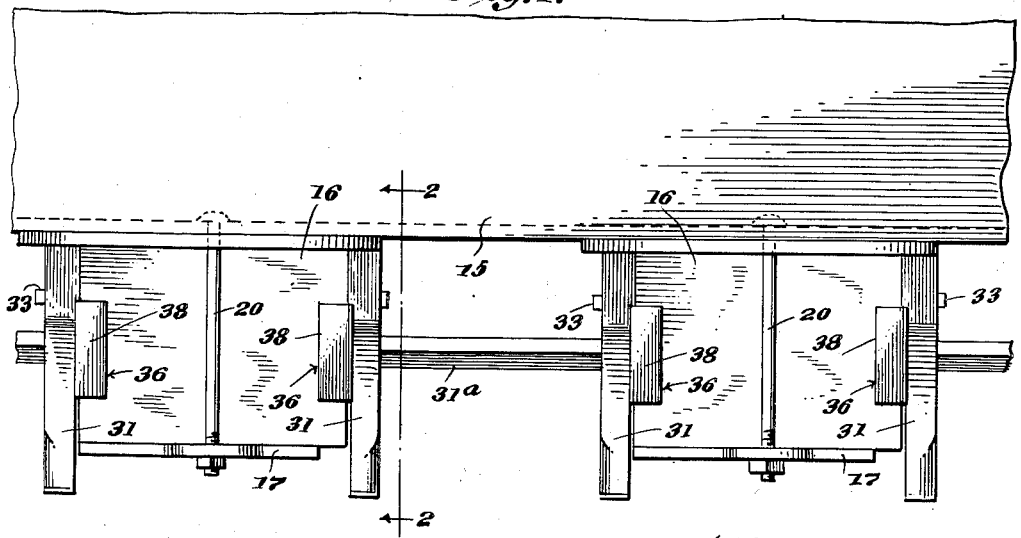
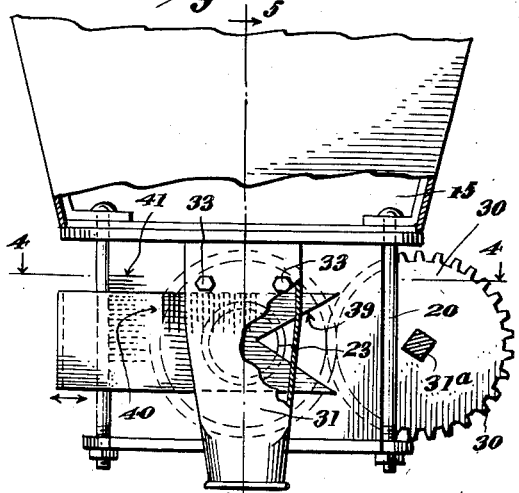
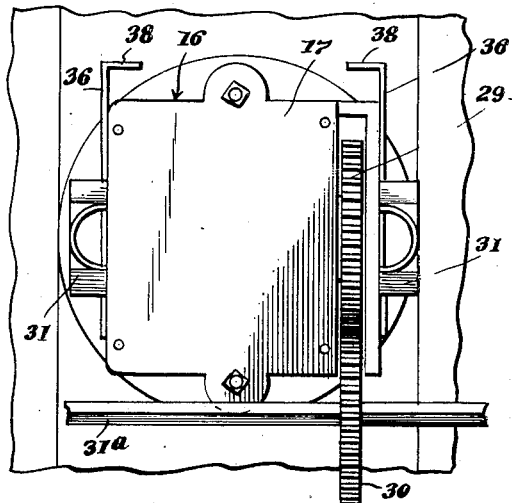
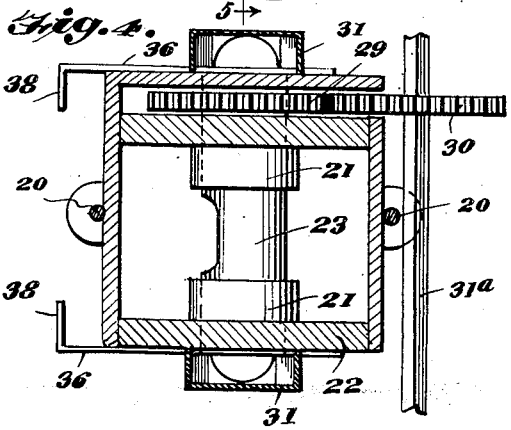
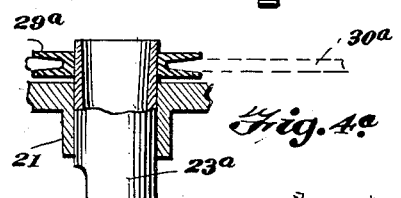
Inventor
ALVIN E. SIMONSON
By Irving A. McCathran
Attorney Jan. 23, 1940.  A. E. SIMONSON  2,188,235
PLANTER
Filed May 5, 1938   2 Sheets-Sheet 2
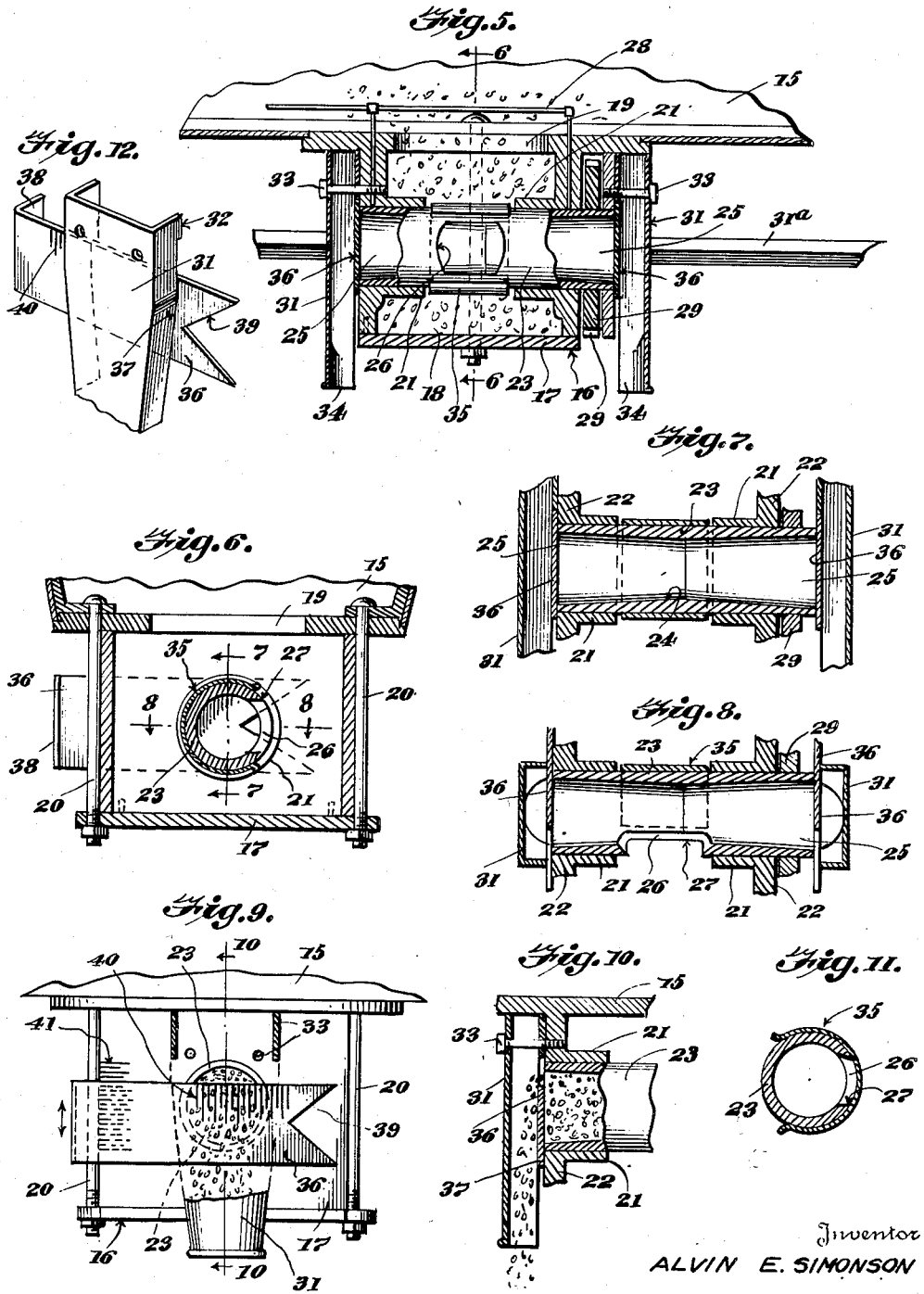
Inventor
ALVIN E. SIMONSON Patented Jan. 23, 1940

2,188,235

UNITED STATES PATENT OFFICE 2,188,235

PLANTER

Alvin E. Simonson, Kismet, Kans.

Application May 5, 1938, Serial No. 206,248

8 Claims. (Cl. 221—130)

This invention relates to planters, and has for one of its objects the production of a simple and efficient means for facilitating the planting of two rows of seed with one unit.

A further object of this invention is the production of a simple and efficient means for controlling the amount of material or seed to be discharged from the ends of the distributing tube of the planting unit.

Other objects and advantages of this invention will appear throughout the following specification and claims.

In the drawings:

Figure 1 is a front elevational view of a portion of a planter showing a plurality of planter units carried thereby;

Figure 2 is a vertical sectional view taken on line 2—2 of Figure 1;

Figure 3 is a bottom plan view of one of the units, a fragmentary portion of the planter being shown;

Figure 4 is a horizontal sectional view taken on line 4—4 of Figure 2;

Figure 4a is a sectional view illustrating a modified drive means for the feeding tube;

Figure 5 is a vertical sectional view taken on line 5—5 of Figure 2;

Figure 6 is a vertical sectional view taken on line 6—6 of Figure 5;

Figure 7 is a vertical sectional view taken on line 7—7 of Figure 6;

Figure 8 is a horizontal sectional view taken on line 8—8 of Figure 6;

Figure 9 is an end elevational view of one of the planter units, a portion of one of the discharge spouts being shown in section;

Figure 10 is a vertical sectional view taken on line 10—10 of Figure 9;

Figure 11 is a transverse sectional view through the distributing tube showing the closure clip in a closing position;

Figure 12 is a fragmentary perspective view of one of the discharge spouts showing one of the gate valves associated therewith.

By referring to the drawings, it will be seen that 15 designates a conventional hopper from a planter of the usual type, from which are suspended a plurality of planter units indicated generally by the numeral 16. One or more of these units may be suspended from the bottom of the hopper 15 without departing from the spirit of the invention. Each planter unit comprises a casing 17 having a compartment 18 in which the seed or other material to be fed from the planter unit 16 may pass through the feeding aperture 19 communicating with the interior of the hopper 15. The casing 17 is secured or anchored in engagement with the bottom of the hopper 15 by means of suitable anchoring bolts 20, as shown in detail in Figure 6. The casing 17 is also provided with aligned transversely extending journal portions 21 carried by the side walls 22 of the casing 17, as shown in detail in Figure 5.

A feeding tube 23 is journaled in the journal portions 21 of the side walls 22, and this feeding tube 23 is provided with a central bore 24 extending longitudinally of the tube 23, the bore being enlarged towards the opposite discharge ends 25 of the tube, as shown in detail in Figures 7 and 8 to facilitate the delivery of the grain or other material towards the ends of the tube 23 as the material enters the entrance port 26 formed in the center and upon one side of the tube 23, as shown in Figures 5, 6 and 8. The edges of the port or opening 26 are milled to provide sharp cutting edges 27 for the purpose of cutting the straws or stems that are sometimes left in the seeds, into bits. Suitable lubricating pipes 28 are extended through the side walls 22 of the casing 17 and communicate with the journals 21 for the purpose of leading lubricating oil to the feeding tube 23 as it passes through the journals 21. A driving gear 29 is carried at one end of the feeding tube 23, and this driving gear 29 may be driven by means of a power gear 30 carried by a shaft 31a, which shaft 31a may be driven in turn in any suitable or desired manner by the carrying wheel or other suitable driving mechanism. It should be understood that any type of driving means may be substituted for the gears 29 and 30 without departing from the spirit of the invention.

Discharge spouts 31 are carried by the opposite sides of the casing 16 and are provided with inner open faces as will be obvious by considering Figure 12, the edges 32 of the spouts 31 abutting against the side walls 22, and these spouts being held in position by suitable anchoring bolts 33. The spouts, of course, may be secured in any suitable or desired manner, and these spouts are provided with open lower discharge ends 34 from which the grain or material passing from the feeding tube 23 may be deposited into or upon the ground over which the device may be passing.

When planting a large amount of grain, the machine will actuate with the port 26 normally open, and as the feeding tube 23 rotates, the grain will be picked up through the aperture or port 26 as the material or grain falls through the feeding aperture 19, the grain or material then being fed through opposite ends of the tube 23 in the direction of the discharge spouts 31. When it is desired to plant only a package of seed, the seed may be deposited through the aperture or port 26 by reaching down through the aperture 19 and the segmental spring clip 35 may be moved to a position such as is shown in the sectional view in Figure 11 to close the port 26, the seed then being fed towards the opposite ends of the feeding tube 23 and being discharged out through the discharge spouts 31. This spring clip 35 is moved and placed in an open or closing position manually by the operator when desired.

A flat sheet metal gate valve 36 is slidably mounted between each discharge spout 31 and the adjoining end wall 22 of the casing 17 through the notches 37 formed in the abutting edges of the discharge spouts 31 shown in detail in Figure 12. This gate valve 36 is preferably provided with an angularly extending end 38 which projects beyond the casing 17 where it may be engaged by the hand of the operator to facilitate the adjustment of the gate valve in a selected position. The gate valve 36 is provided with a V-shaped notch at its inner end and the valve by being moved longitudinally may regulate the size of the opening at the end of the feeding tube 23 in a manner as shown in Figure 2. Suitable graduations 40 are formed upon the outer face of each sliding gate valve 36, whereby the operator may gage the proper selected position for the gate valve to provide the desired opening at the end of the feeding tube 23. The gate valve 36 is frictionally held in position and may be loosened or tightened by adjusting the bolts 33. By tightening the bolts 33, the gate valves may be bound tightly between the supports and the side walls 22.

The notches 37 formed in the discharge spouts 31 are of greater length than the width of the gate valve 36, as will be noted from the drawings, so that the sliding gate valves 36 may be vertically adjusted with respect to the graduations 41 formed upon the side walls of the casing 17 whereby the gate valves 36 may be lowered, such for instance as to the position shown in Figures 9 and 10, to allow grain to pass out from the ends of the feeding tube 23 over the upper edges of the sliding gate valves 36.

From the foregoing description it will be seen that a very simple and efficient planter has been provided for facilitating the planting of two parallel rows of seed simultaneously by entering the seed into the feeding tube 23 at the center and distributing the seed laterally towards opposite ends of the tube, then discharging the seed out through the discharge spouts 31. An efficient means has also been provided for controlling the discharge of the seeds or other material through the open ends of the feeding tube 23 through the medium of the adjustable sliding gate valves 36 carried at the ends of the tube 23. The gate valves 36 are preferably frictionally held in position, the same preferably fitting tightly through the notches 37 so that the valves may be held in position and will not be forced out of adjustment.

As shown in Figure 4a, a modified type of driving means may be provided for the feeding tube 23a wherein the feeding tube 23a carries a grooved pulley 29 to be driven by a belt or other suitable means 30a.

It should be understood that certain detail changes in the mechanical construction may be employed without departing from the spirit of the invention, so long as such changes fall within the scope of the appended claims.

Having described the invention, what I claim is:

1. A planter unit of the class described comprising a casing having a hollow feeding tube arranged horizontally therein, the feeding tube having open opposite ends extending through the casing, the tube also having an entrance opening for admitting seed and other material therein, means for automatically actuating said feeding tube to open the entrance opening at regular intervals to receive seed and other material, means for directing material discharged from the opposite ends of said tube downwardly, said tube being gradually enlarged from the center towards the opposite ends thereof to facilitate the discharge of the material entering the tube towards the opposite open ends thereof.

2. A planter unit of the class described comprising a casing, a feeding tube mounted horizontally within the casing and rotatable therein, means for rotating the tube, the tube having opposite open discharge ends and also having an entrance opening intermediate the discharge ends, the tube being adapted to discharge material entering the tube towards the opposite discharge ends, and means for opening and closing the ends of the tube.

3. A planter unit of the class described comprising a casing, a feeding tube mounted horizontally within the casing and rotatable therein, means for rotating the tube, the tube having opposite open discharge ends and also having an entrance opening intermediate the discharge ends, the tube being adapted to discharge material entering the tube towards the opposite discharge ends, and sliding gate plates carried by said casing and movable across the open ends of the tube, for controlling and varying the discharge of material from the opposite ends of the tube.

4. A planter unit of the class described comprising a casing, a feeding tube mounted horizontally within the casing and rotatable therein, means for rotating the tube, the tube having opposite open discharge ends and also having an entrance opening intermediate the discharge ends, the tube being adapted to discharge material entering the tube towards the opposite discharge ends, and sliding gate plates carried by said casing and movable across the open ends of the tube, for controlling and varying the discharge of material from the opposite ends of the tube, said gates being movable longitudinally and transversely in a selected direction to uncover portions of the ends of the tube to regulate the size of the discharge openings at the ends of the tube.

5. A planter unit of the class described comprising a casing, a feeding tube mounted horizontally within the casing and rotatable therein, means for rotating the tube, the tube having opposite open discharge ends and also having an entrance opening intermediate the discharge ends, the tube being adapted to discharge material entering the tube towards the opposite discharge ends, sliding gate plates carried by said casing and movable across the open ends of the tube for controlling and varying the discharge of material from the opposite ends of the tube, said gates being movable longitudinally and transversely in a selected direction to uncover portions of the ends of the tube to regulate the size of the discharge openings at the ends of the tube, and graduated means for facilitating the placing of the gate plates in selected accurate locations to gage the size of the discharge openings at the ends of the tube.

6. A planter unit of the class described comprising a casing, a feeding tube mounted horizontally within the casing and rotatable therein, means for rotating the tube, the tube having opposite open discharge ends and also having an entrance opening intermediate the discharge ends, the tube being adapted to discharge material entering the tube towards the opposite discharge ends, sliding gate plates carried by said casing and movable across the open ends of the tube for controlling and varying the discharge of material from the opposite ends of the tube, said gates being movable longitudinally and transversely in a selected direction to uncover portions of the ends of the tube to regulate the size of the discharge openings at the ends of the tube, each gate plate having a substantially V-shaped notch at one end whereby the V-shaped notched portions of the plates may be adjusted over the ends of the tube to provide variable V-shaped openings over the ends of the tube.

7. A planter unit of the class described comprising a casing, a feeding tube mounted horizontally within the casing and rotatable therein, means for rotating the tube, the tube having opposite open discharge ends and also having an entrance opening intermediate the discharge ends, the tube being adapted to discharge material entering the tube towards the opposite discharge ends, sliding gate plates carried by said casing and movable across the open ends of the tube for controlling and varying the discharge of material from the opposite ends of the tube, said gates being movable longitudinally and transversely in a selected direction to uncover portions of the ends of the tube to regulate the size of the discharge openings at the ends of the tube, spouts carried by the opposite sides of said planter unit and having open discharge lower ends, and said spouts having notches along one side thereof for receiving said plates and constituting a guide therefor.

8. A planter unit of the class described comprising a casing, a feeding tube mounted horizontally within the casing and rotatable therein, means for rotating the tube, the tube having opposite open discharge ends and also having an entrance opening intermediate the discharge ends, the tube being adapted to discharge material entering the tube towards the opposite discharge ends, sliding gate plates carried by said casing and movable across the open ends of the tube for controlling and varying the discharge of material from the opposite ends of the tube, said gates being movable longitudinally and transversely in a selected direction to uncover portions of the ends of the tube to regulate the size of the discharge openings at the ends of the tube, and each plate having angularly bent outer ends constituting hand grip portions.

ALVIN E. SIMONSON.